(12) United States Patent
Kashine

(10) Patent No.: US 7,068,484 B2
(45) Date of Patent: Jun. 27, 2006

(54) SECONDARY BATTERY PROTECTION DEVICE

(75) Inventor: Takashi Kashine, Chino (JP)

(73) Assignee: Seiko Epson Corporation, Tokyo (JP)

( * ) Notice: Subject to any disclaimer, the term of this patent is extended or adjusted under 35 U.S.C. 154(b) by 295 days.

(21) Appl. No.: 10/377,889

(22) Filed: Mar. 4, 2003

(65) Prior Publication Data

US 2003/0169021 A1  Sep. 11, 2003

(30) Foreign Application Priority Data

Mar. 8, 2002  (JP) .............................. 2002-063017

(51) Int. Cl.
*H02H 3/00* (2006.01)
(52) U.S. Cl. ..................... 361/79; 361/90; 361/93.1
(58) Field of Classification Search ................. 361/90, 361/118, 91.1, 93.1, 78, 79, 18, 92
See application file for complete search history.

(56) References Cited

U.S. PATENT DOCUMENTS

| | | | | |
|---|---|---|---|---|
| 5,332,927 A | * | 7/1994 | Paul et al. .................. 307/66 |
| 5,844,398 A | * | 12/1998 | Kwan et al. ................ 320/123 |
| 5,963,019 A | * | 10/1999 | Cheon ....................... 320/150 |
| 6,174,617 B1 | * | 1/2001 | Hiratsuka et al. ........... 429/90 |
| 6,340,889 B1 | * | 1/2002 | Sakurai ...................... 324/433 |
| 6,489,749 B1 | * | 12/2002 | Nakashimo et al. ........ 320/134 |
| 6,661,200 B1 | * | 12/2003 | Odaohhara ................. 320/132 |
| 6,798,171 B1 | | 9/2004 | Sakurai ...................... 320/132 |

FOREIGN PATENT DOCUMENTS

| | | |
|---|---|---|
| CN | 1393971 A | 1/2003 |
| JP | A-11-233157 | 8/1999 |

* cited by examiner

*Primary Examiner*—Stephen W. Jackson
(74) *Attorney, Agent, or Firm*—Oliff & Berridge, PLC

(57) ABSTRACT

Device miniaturization is made possible by building a battery protection circuit in a microcomputer. A secondary battery protection device comprises a voltage detection means 7 that detects a voltage of a power supply circuit 6 including a secondary battery 1, a current detection means 8 that detects a current of the power supply circuit, and a battery protection circuit 10 that shuts off the power supply circuit 6 based on a signal representing a detection made by the voltage detection means 7 or the current detection means 8 of an excess current that is generated in the power supply circuit 6, wherein the protection circuit 10 is built in a microcomputer 13.

2 Claims, 3 Drawing Sheets

US 7,068,484 B2

SECONDARY BATTERY PROTECTION DEVICE

BACKGROUND OF THE INVENTION

1. Field of Invention

The present invention relates to a secondary battery protection device that detects an excessive current and shuts off a power supply circuit of a secondary battery.

2. Description of Related Art

FIG. 3 shows an example of a related art secondary battery protection device.

FIG. 3 shows a secondary battery 1, a charger 2, a switching element 3, such as an FET, a resistance to detect an excessive current 4, and a load resistance 5. These circuit elements compose a power supply circuit 6. A battery protection circuit 10 is equipped with a sense amplifier 7 that is connected to a positive side of the secondary battery 1, a sense amplifier 8 that is connected to a downstream side of the resistance 4, and an OR circuit 9 that takes an OR of outputs of the sense amplifiers 7 and 8 to turn off the switching element 3. The sense amplifier 8 connects to a battery 16 to provide a reference voltage. The battery protection circuit 10 is independent of a microcomputer, and exchanges signals with a CPU 11 of the microcomputer through a signal line.

Operations are described below. A voltage on the positive side of the secondary battery 1 is always detected by the sense amplifier 7, and a current that flows through the resistance 4 is detected by the sense amplifier 8. When an excess current is generated in the power supply circuit 6 for the secondary battery 1, an output that indicates an abnormality is generated in a voltage detection device by the sense amplifier 7 or a current detection device by the sense amplifier 8, the switching element 3 is turned off by an output from the OR circuit 9 to shut off the power supply circuit 6, such that the secondary battery 1 is protected.

However, a circuit, such as the one described above in which an output of the voltage detection means 7 or the current detection means 8 is directly inputted in the battery protection circuit 10, is subject to a problem. If a current or a voltage that is inputted in the battery protection circuit 10 is close to a threshold value, an output of the battery protection circuit 10 becomes unstable, such that the switching element 3 frequently turns on and off, which leads to a trouble in protecting the secondary battery 1.

Furthermore, since the battery protection device 6 is independent of the microcomputer, their circuit space becomes large and the size of the apparatus becomes large.

The present invention addresses the above and/or other problems, and provides a secondary battery protection device that enables miniaturization through building a battery protection circuit in a microcomputer.

The present invention can also provide a secondary battery protection device in which a power supply circuit does not frequently turn on and off even when a current or a voltage inputted in a battery protection circuit is close to a threshold value.

SUMMARY OF THE INVENTION

To address or solve the above, the present invention provides a secondary battery protection device that includes a voltage detection device that detects a voltage of a power supply circuit including a secondary battery, a current detection device that detects a current of the power supply circuit, and a protection circuit that shuts off the power supply circuit based on a signal representing a detection made by the voltage detection device or the current detection device of an excess current that is generated in the power supply circuit. The protection circuit is built in a microcomputer.

Also, the present invention can further include a latch that holds an input signal from the current detection device or the voltage detection device as is.

Furthermore, the present invention can be provided such that an output of the latch defines an interrupt request flag to the microcomputer.

Also, the present invention can be provided such that an output of the voltage detection device or the current detection device is directly inputted in an I/O register of the microcomputer to conduct an on-operation of the power supply circuit based on a judgment of the microcomputer.

DETAILED DESCRIPTION OF PREFERRED EMBODIMENTS

Figure 3:
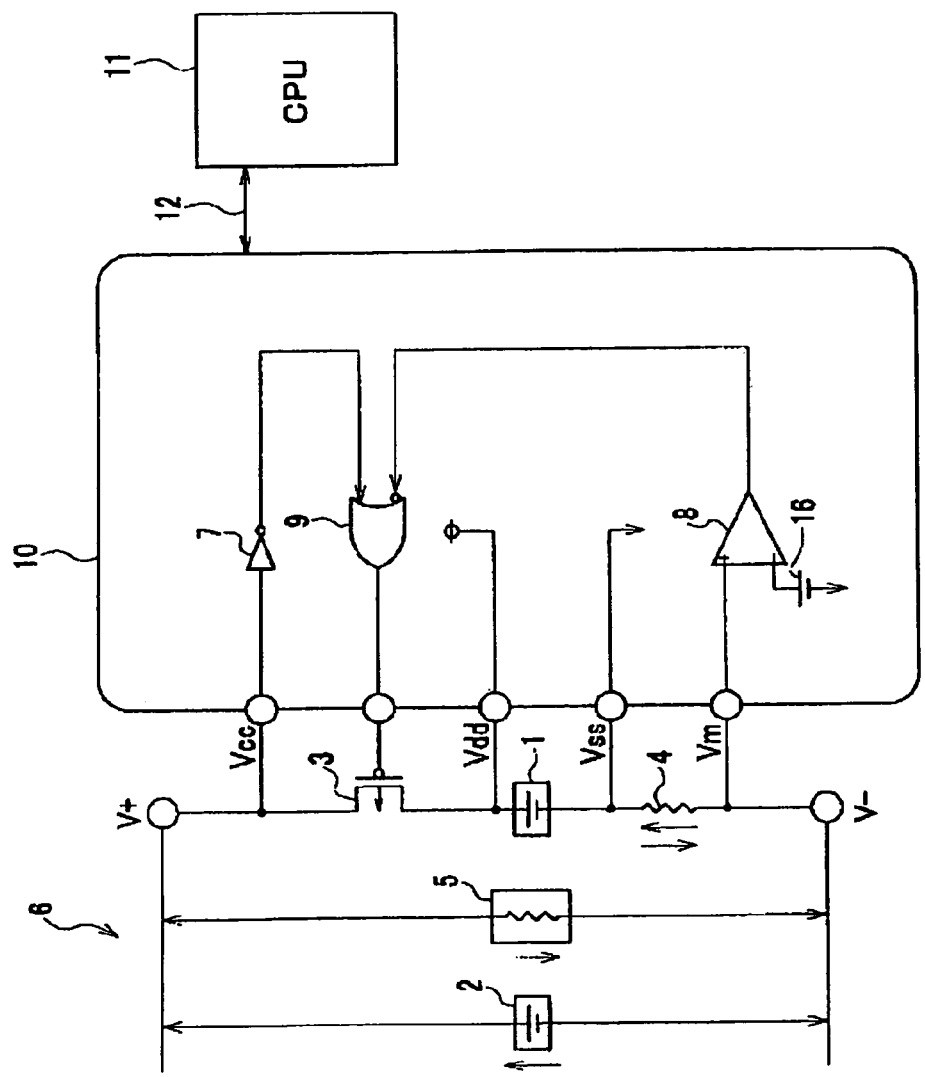
FIG. 3 is a schematic that shows a circuit diagram of a related art secondary battery protection device.

Secondary battery protection circuits in accordance with exemplary embodiments of the present invention are described below with reference to the accompanying drawings. Members and functions that are the same as those indicated in FIG. 3 are assigned the same reference numerals.

Figure 1:
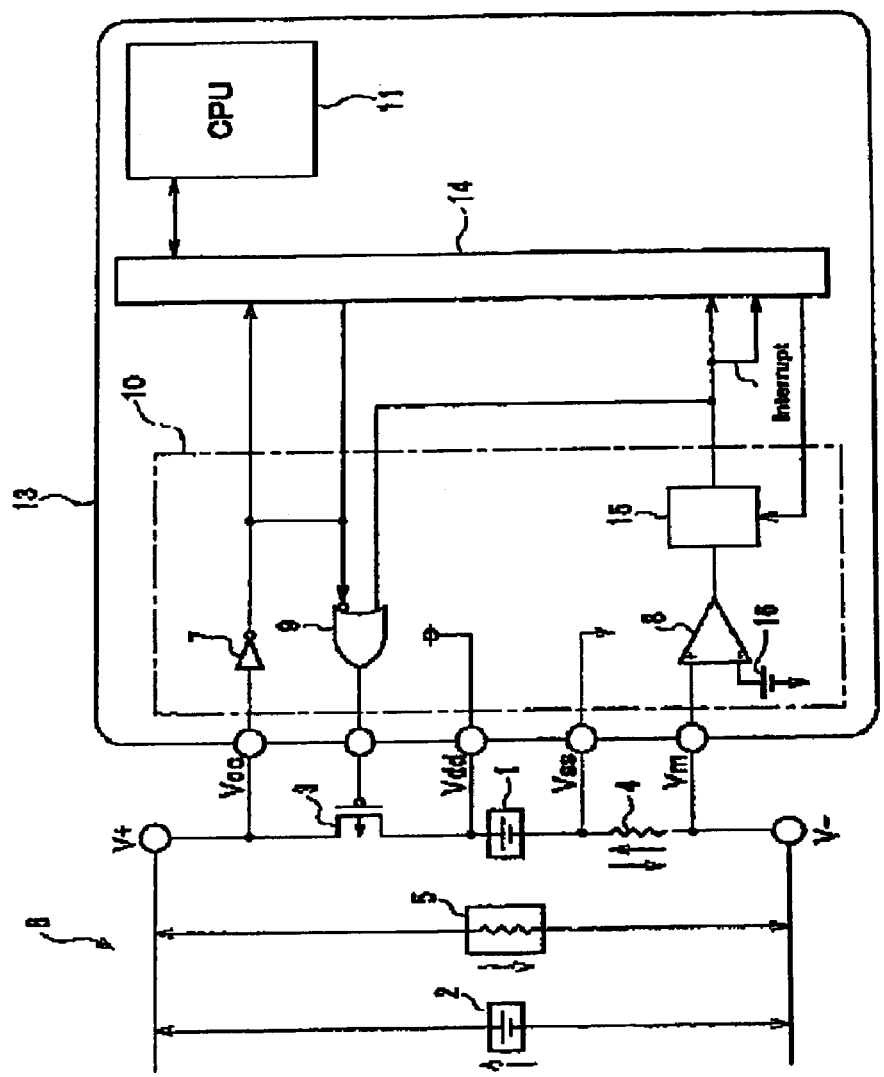
FIG. 1 is a schematic that shows a circuit diagram of a secondary battery protection device in accordance with a first exemplary embodiment of the present invention.

FIG. 1 is a schematic that shows a first exemplary embodiment of the present invention. FIG. 1 shows a microcomputer 13 that is equipped with a CPU 11 and a system bus 14. A battery protection circuit 10 is built in the microcomputer 13. The battery protection circuit 10 is equipped with sense amplifiers having the same functions as those indicated in FIG. 3, in other words, a sense amplifier 7 for voltage detection and a sense amplifier 8 for current detection that is connected to a downstream side of a resistance 4. An output side of the sense amplifier 7 is connected to the system bus 14, and an output side of the sense amplifier 8 is connected to a latch 15. Also, there is provided an OR circuit 9 which takes an OR of an output signal of the sense amplifier 7 and an output signal of the latch 15 to turn off a switching element 3 of a power supply circuit 6.

Operations are described below.

A voltage (Vcc) on the positive side of a secondary battery 1 is always detected by the sense amplifier 7, and a current that flows through the resistance 4 is detected by the sense amplifier 8. When an excess current is generated in the power supply circuit 6, an output that indicates the excess current is generated in a voltage detection device by the sense amplifier 7 or a current detection device by the sense amplifier 8. In accordance with the present exemplary embodiment, an output of the sense amplifier 8 is inputted in the latch 15, and its state is held there. An output of the latch 15 is inputted in a logic circuit 9, and an output from the logic circuit 9 turns off the switching element 3 to thereby shut off the path of the secondary battery 1.

In this manner, through inputting an output of the sense amplifier 8 in the latch 15 and holding its state, the discharge path of the secondary battery 1 is prevented from frequently turning on and off even when the level of an input to the sense amplifier 8 is close to a threshold value.

As shown in FIG. 1, it is possible to input an output of the latch 15 in the system bus 14 as an interrupt request flag. By so doing, an excess current detection state provided by the sense amplifier 8 can be promptly notified to the CPU 11. Also, a state after the discharge path of the secondary battery 1 is shut off may be judged by software, so that the time required for a succeeding operation to restore the discharge path can be shortened.

Furthermore, in accordance with the present exemplary embodiment, an output of the sense amplifier 7 may be directly connected to an I/O register through the system bus 14, such that an input voltage can be detected by the CPU 11 in real time without passing through a latch. In this manner, an input state can be detected by the CPU 11 in real time without being held. Therefore, for example, if a charger 2 is connected after the switching element 3 has been shut off, the CPU 11 can make a judgment as to if the voltage (Vcc) rapidly increases, and can immediately turn on the switching element 3 based on the judgment. Also, the CPU 11 may read an input state multiple times, such that noises can be removed in a pseudo manner by the software, and the interval and the number of input state judgments can also be set optionally by the software.

Figure 2:
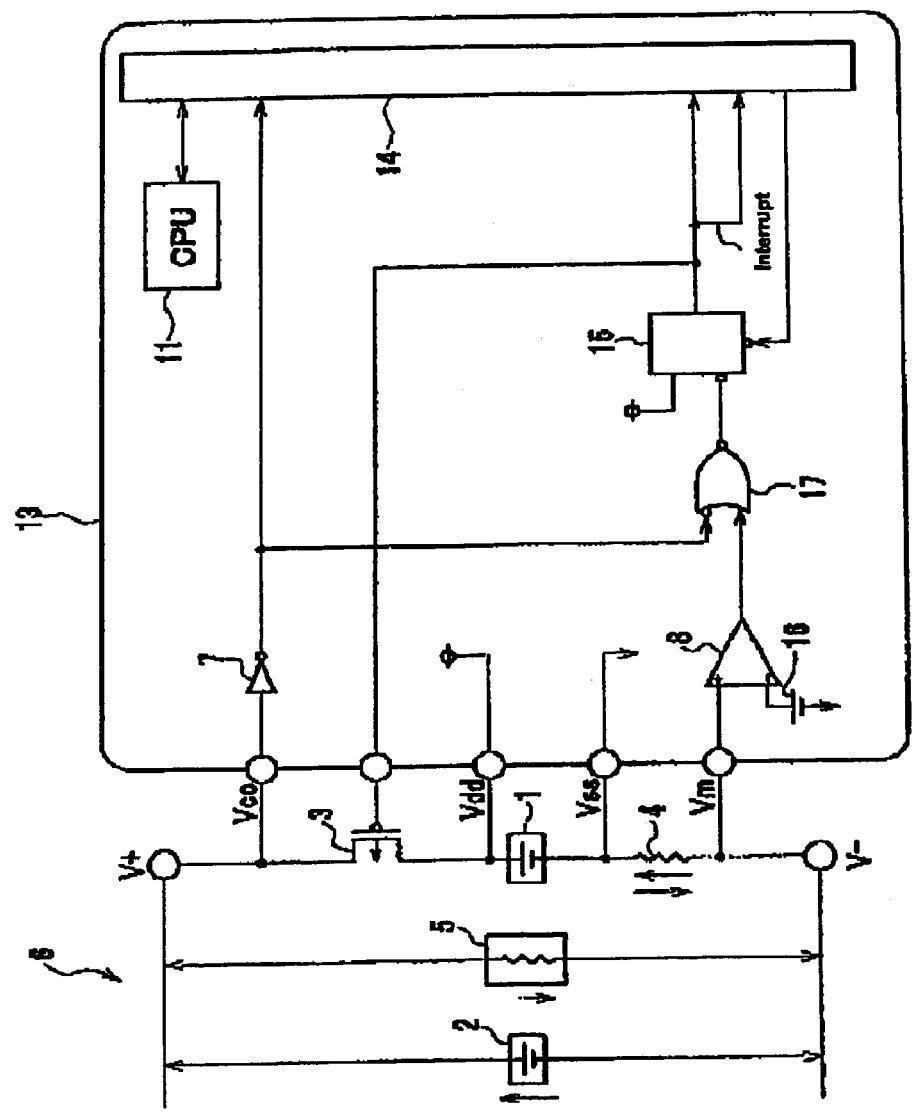
FIG. 2 is a schematic that shows a circuit diagram of a secondary battery protection device in accordance with a second exemplary embodiment of the present invention.

FIG. 2 is a schematic that shows a second exemplary embodiment of the present invention.

In this exemplary embodiment, a logic circuit 17 is provided in a preceding stage of the latch 15; an output side of the sense amplifier 7 is connected to the system bus 14, and also inputted in the logic circuit 17; and an output of the sense amplifier 8 is also inputted in the logic circuit 17. An OR of output signals of the sense amplifiers 7 and 8 is inputted in the latch 15, and the switching element 3 is operated by an output of the latch 15. This exemplary embodiment is the same as the previous exemplary embodiment in that an output of the latch 15 is inputted in the system bus 14 as an interrupt request flag, an output of the sense amplifier 7 is directly connected to an I/O register through the system bus 14, and an input voltage is detected in real time by the CPU 11.

In this exemplary embodiment, both of a voltage input from the sense amplifier 7 and a current input from the sense amplifier 8 are held by the latch 15, such that the discharge path of the secondary battery 1 is prevented from frequently turning on and off even when the levels of inputs to the sense amplifier 7 and the sense amplifier 8 are close to threshold values.

As described above, the present invention is effective in that, because the battery protection circuit is built in the microcomputer, further device miniaturization can be achieved compared to the one in which they are structured independently from one another. Also, because a signal of the battery protection circuit can be inputted in the microcomputer, a judgment result provided can be used for on-off operations of the power supply circuit.

Also, the present invention is effective in that, because the latch is provided to hold an input signal from the voltage detection device or the current detection device as is, the discharge path of the secondary battery is prevented from frequently turning on and off even when the level of an input to the voltage detection device or the current detection device is close to a threshold value.

Also, the present invention is effective in that, because an output of the latch is used as an interrupt request flag to the microcomputer, an excess current detection state provided by the sense amplifier can be promptly notified to the CPU; and a state after the discharge path of the secondary battery is shut off may be judged by software, so that the time required for a succeeding operation to restore the discharge path can be shortened.

Also, the present invention is effective in that, because an output of the voltage detection device or the current detection device is directly inputted in an I/O register of the microcomputer, and on-operations of the power supply circuit can be conducted based on judgments by the microcomputer, the CPU can make a judgment as to whether the charger is connected after the power supply circuit has been shut off, and can immediately turn on the switching element based on the judgment.

What is claimed is:

1. A secondary battery protection device, comprising:
   a voltage detection device that detects a voltage of a power supply circuit including a secondary battery;
   a current detection device that detects a current of the power supply circuit; and
   a protection circuit that shuts off the power supply circuit based on a signal representing a detection made by the voltage detection device or the current detection device of an excess current that is generated in the power supply circuit, the protection circuit being built in a microcomputer, an output of the voltage detection device or the current detection device being directly inputted in an I/O register of the microcomputer to conduct an on-operation of the power supply circuit based on a judgment of the microcomputer.

2. A secondary battery protection device, comprising:
   a voltage detection device that detects a voltage of a power supply circuit including a secondary battery;
   a current detection device that detects a current of the power supply circuit; and
   a protection circuit that shuts off the power supply circuit based on a signal representing a detection made by the voltage detection device or the current detection device of an excess current that is generated in the power supply circuit, the protection circuit being built in a microcomputer;
   a latch that holds an input signal from the current detection device or the voltage detection device as is, an output of the latch defining an interrupt request flag to the microcomputer so that a state after a discharge path of the secondary battery is shut off is judged by software.

* * * * *